Figure 1:
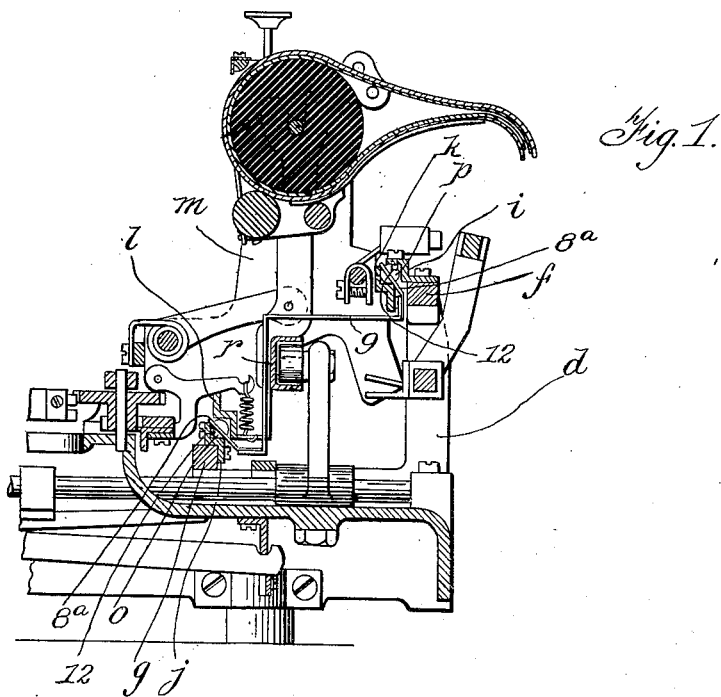

G. W. DAVIS.
ROLLER BEARING FOR TYPE WRITERS.
APPLICATION FILED JUNE 23, 1911.

1,097,215.

Patented May 19, 1914.

George W. Davis
Inventor
By Attorney

Witnesses

UNITED STATES PATENT OFFICE.

GEORGE WILLIAM DAVIS, OF WESTMOUNT, QUEBEC, CANADA.

ROLLER-BEARING FOR TYPE-WRITERS.

1,097,215. Specification of Letters Patent. Patented May 19, 1914.

Original application filed January 3, 1907, Serial No. 350,637. Divided and this application filed June 23, 1911. Serial No. 634,952.

*To all whom it may concern:*

Be it known that I, GEORGE WILLIAM DAVIS, a subject of the King of Great Britain, of Westmount, in the district of Montreal, Province of Quebec, Canada, have invented certain new and useful Improvements in Roller-Bearings for Type-Writers; and I do hereby declare that the following is a full, clear, and exact description of the same.

The object of this invention is to provide new antifriction means for supporting the carriage in its supporting frame and a carriage support acting in conjunction with the above mentioned means to prevent lost motion between the type and the platen when they impinge upon the latter.

Figure 2:
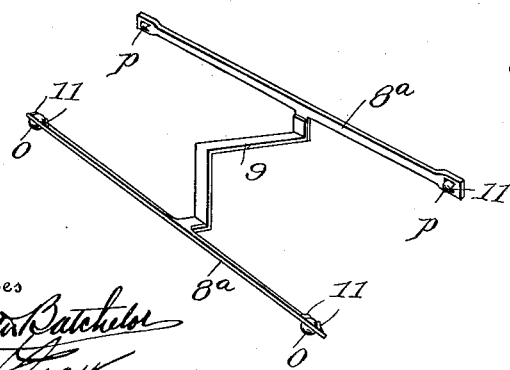
Figure 3:
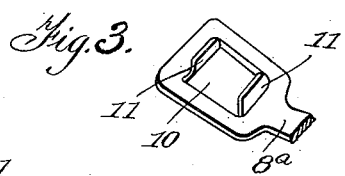

For full comprehension however of my invention reference must be had to the accompanying drawings forming a part of this specification in which like reference characters indicate the same parts and wherein:

Figure 1 is a vertical transverse sectional view of the carriage supporting frame and roller bearings therefor; Fig. 2 is a perspective view of the cage for positioning the balls upon which the carriage runs; and Fig. 3 is an enlarged perspective view of one end of the cage.

This invention relates to that type of writing machine illustrated in patent application Serial No. 350,637, filed January 3, 1907, of which this is a divisional part.

The carriage supporting frame comprises a pair of angular end frame pieces $d$ the ends of the vertical and horizontal legs of which have upper and lower connecting bars $f$ and $g$, respectively, secured thereto and constituting, with the said end pieces, an intact carriage supporting frame. These connecting bars have rigidly secured thereto a pair of rails $i$ and $j$ of Z-cross-section and co-acting with a second pair $k$ and $l$ of similar cross section secured rigidly to the end frame pieces $m$ of the carriage and forming therewith the main carriage frame and presenting with the rails $k$ and $l$ raceways for anti-friction balls $o$ and $p$ before mently shown.

The main carriage is supported upon the anti-friction balls $o$ and $p$ before mentioned, and lost motion between the type when they strike and their abutment (the platen) is prevented by the particular means (constituted by these anti-friction balls and the raceways) for supporting the same. Owing to the positions of the raceways relatively to the center of gravity of the carriage, one being in front thereof and the other behind, there is a tendency given to the carriage to cant toward the rear of the machine thus causing the said carriage to constantly lie upon the rear balls to which the rearward side load, due to the conditions just described, is transmitted, and as these last named balls are mounted on the rear of the frame, such side load, and the momentary increases thereof (due to the impingement of the type) are exerted directly and consequently without lost motion upon the frame.

I utilize a pair of balls in each raceway, those in the forward raceway being indicated at $o$ and those in the rear at $p$ and these balls are retained in their proper relative positions by a movable cage consisting of a pair of arms $8^a$ united by a cross piece 9 bent to clear the channel bar $r$ of the vibratory carriage and other parts. Each end of these arms 8 is formed with a square opening 10 and transversely bent lugs 11 the latter being adapted to be acted upon by the ball located in the said square opening and this action of the four balls causing the cage to move with them and preserve their proper relative positions. This cage and the balls traveling therewith have their movement in either direction limited by a series of stop screws 12 carried by the ends of each of the Z-rails $i$, $j$, $k$, $l$. This is effected if the cage should happen to become displaced from its proper position relatively to the carriage, in which case the stop screws on the rear of the latter will catch up to it and shove it ahead and thus return it to its proper position. Or, if the cage should happen to be displaced to a wrong position in advance, it will engage the stop screws in the ends toward which it is traveling of the Z-rails of the frames and be arrested, the carriage then sliding over the balls and thus again returning the cage to its proper position. This rectifying action only takes place as in former machines when the displacement of the cage is so great that the carriage comes upon it before the latter engages the marginal stop.

What I claim is as follows:

In a typewriter, the combination with the main frame, the carriage, the platen upon the carriage, a ball bearing rail on the frame at the rear of the platen, a second ball bearing rail on the frame in front of the platen and at a lower level than the first mentioned rail, coöperating rails carried by the carriage and anti-friction balls located between the rails, of a positioning device for the balls consisting of a right angled transverse body piece, an upper arm and a lower arm each united centrally of its length to the said body piece, provided with apertures at its ends and extending parallel with the ball bearing rails, to receive and position the anti-friction balls, such upper and lower arms being formed with laterally projecting lugs at each end of said apertures.

In testimony whereof, I have signed my name to this specification, in the presence of two subscribing witnesses.

GEORGE WILLIAM DAVIS.

Witnesses:
STANLEY C. KING,
FRED. V. LEAU.